July 12, 1966 K. L. WESTERCAMP 3,260,071
UNIVERSAL JOINT SEAL
Filed Aug. 13, 1964

INVENTOR.
Kenneth L. Westercamp
BY
J. L. Carpenter
ATTORNEY

United States Patent Office 3,260,071
Patented July 12, 1966

3,260,071
UNIVERSAL JOINT SEAL
Kenneth L. Westercamp, Saginaw, Mich., assignor to General Motors Corporation, Detroit, Mich., a corporation of Delaware
Filed Aug. 13, 1964, Ser. No. 389,367
4 Claims. (Cl. 64—32)

This invention relates to universal joints and more particularly to a seal for a universal joint.

It is often necessary to protect the working mechanism of a universal joint from mud and foreign particles which might enter the joint and cause malfunction or rapid wear. It is also desirable to prevent the escape of lubricant from the joint mechanism. In the past rubber seals have been used to accomplish this purpose. However, when they are made large enough to accommodate large joint angles they are excessively bulky and subject to injury. Metal shield type seals have also been used but they have not been entirely successful since they require constant lubrication and are inherently noisier than the rubber seals.

One feature of this invention is that it provides a compact seal for a universal joint which will permit large joint angles.

Another feature of this invention is that it provides a seal for a universal joint having an elastomeric portion to accommodate small joint angles and a resilient portion to accommodate large joint angles.

These and other features of this invention will become apparent from the following specification and drawing wherein.

Figure 1:
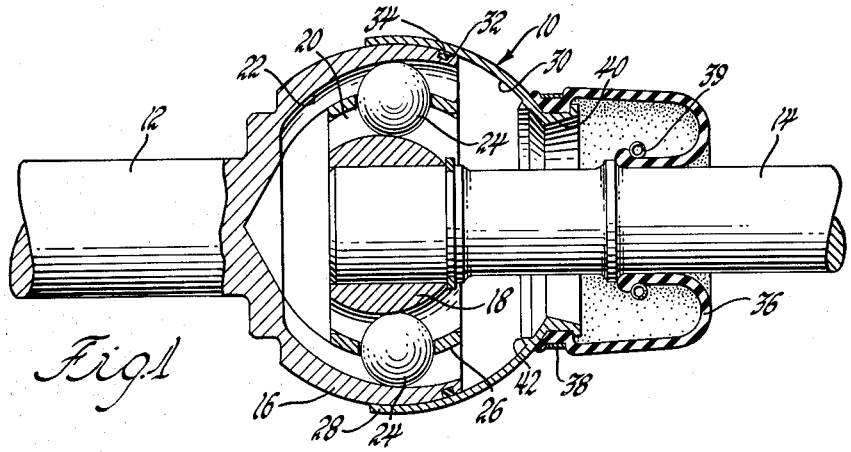
FIGURE 1 is a sectional view of a universal joint having a seal according to this invention, with the axes of the driving and driven members aligned.

Referring now to the drawing, a universal joint designated generally 10 includes members 12 and 14, either of which may be the driving or driven member. A housing 16 having a spherical outer surface is integral with the member 12. A flange 18 is secured to the member 14 and includes grooves 20 spaced about its periphery. Grooves 22, spaced about the inner periphery of the housing correspond to the grooves 20 of the flange. Spherically shaped drive elements 24 are located within each of the corresponding pairs of grooves. A cage 26 is located between the flange and the housing and maintains the drive elements 24 in a plane which bisects the angle formed by the axes of the members 12 and 14 to insure operation as a constant velocity joint.

While one type of universal joint has been shown for the purpose of illustration, it is to be understood that other types may also be used.

The seal of this invention includes a resilient shield or socket member 28 having a spherical portion 30 which engages the outer surface of the housing 16. A sealing relationship between the shield and the housing is maintained by means of an O-ring 32 located in the groove 34 of the housing. A rubber tube or boot 36 has one end thereof secured to the shield by a clamping ring 38 and the other return bent end thereof encircling and secured to the member 14 by a garter spring 39. Since the boot 36 need not permit large joint angles it may be made of stronger and thicker, although less flexible, elastomeric material.

Figure 2:
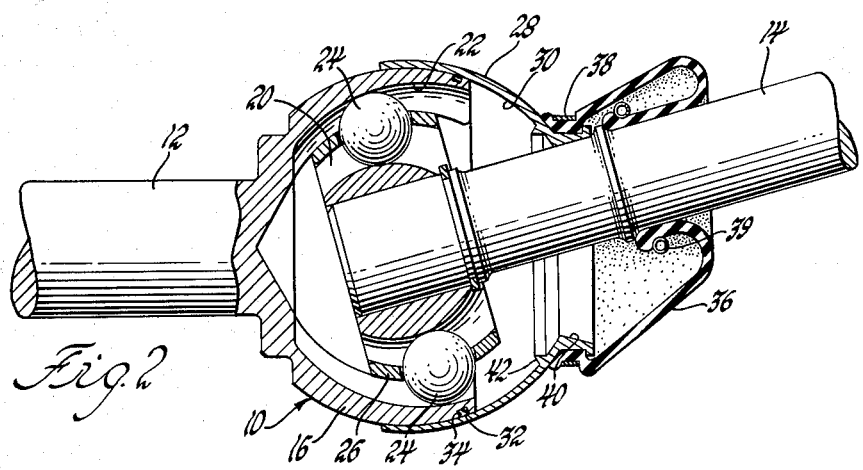
FIGURE 2 is a view similar to FIGURE 1 with the driving and driven members disposed at a relatively small joint angle.
Figure 3:
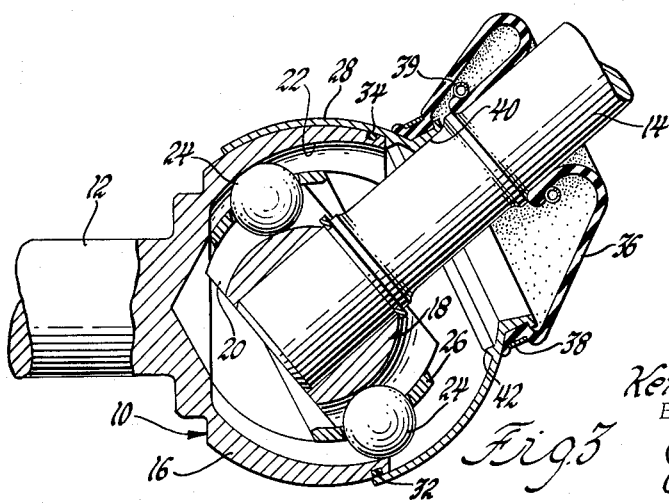
FIGURE 3 is a view similar to FIGURE 1 with the driving and driven members disposed at a relatively large joint angle.

As can be seen from a comparison of FIGURES 1 and 2, movement of the members 12 and 14 through relatively small joint angles is accommodated by flexing of the boot 36 while the socket member 28 remains stationary relative to the housing 16. Upon reference to FIGURES 2 and 3, when the members 12 and 14 are moved through relatively large joint angles, the member 14 will engage the frusto-conical surface 40 of the member 28 and move this member relative to the housing 16 to accommodate such movement of the members 12 and 14. It will be noted that the surface 40 is shaped so as to provide line contact with the member 14.

The member 28 includes an inwardly extending rib 42 located adjacent the surface 40. When the joint is in the position shown in FIGURE 3, this rib prevents further movement of the shield 28 in the same direction and independently of member 14. Thus, the O-ring 32 cannot be exposed.

Thus, this invention provides an improved universal joint seal.

I claim:
1. In a universal joint including a housing and driving and driven members extending therefrom, the combination comprising, substantially rigid means slidably and rotatably mounted on said housing and including a portion surrounding one of said driving and driven members, and an elastomeric member secured adjacent one end thereof to said one member and adjacent the other end thereof to said rigid means, said elastomeric member being sufficiently deformable to accommodate angular misalignment between said driving and driven members with a predetermined range, angular misalignment of said driving and driven members beyond said predetermined range causing said one member to engage said portion of said substantially rigid means to move said means relative to said housing.

2. In a universal joint including a spherical housing having a ball portion and driving and driven members extending therefrom, the combination comprising, a socket member slidably and rotatably receiving said ball portion surrounding one of said driving and driven members, and an elastomeric member secured adjacent one end thereof to said portion and adjacent the other end thereof to said one member, said elastomeric member being sufficiently deformable to accommodate angular misalignment between said driving and driven members within a predetermined range, angular misalignment of said driving and driven members beyond said predetermined range causing said one member to engage said portion of said substantially rigid means to move said means relative to said housing.

3. In a universal joint including a housing having a ball portion and driving and driven members extending therefrom, the combination comprising, a socket member slidably and rotatably mounted on the ball portion of said housing and surrounding one of said driving and driven members, a sleeve of elastomeric material having a return bent portion at one end thereof encircling and secured to said one member, and means securing said sleeve adjacent the other end thereof to said socket member, said sleeve being sufficiently deformable to accommodate angular misalignment between said driving and driven members within a predetermined range, angular misalignment of said driving and driven members beyond said predetermined range causing said one member to engage said portion of said substantially rigid means to move said means relative to said housing.

4. The combination recited in claim 3 wherein said socket member includes a rib adapted to engage said ball portion and limit the rotation of said socket member.

References Cited by the Examiner
UNITED STATES PATENTS

| | | | |
|---|---|---|---|
| 1,010,060 | 11/1911 | Loomis | 64—32 X |
| 1,015,267 | 1/1912 | Huff | 64—32 X |
| 3,061,344 | 10/1962 | Gray et al. | 287—90 X |

MILTON KAUFMAN, *Primary Examiner.*

H. C. COE, *Assistant Examiner.*